(12) United States Patent
Miyajima

(10) Patent No.: US 8,321,599 B2
(45) Date of Patent: Nov. 27, 2012

(54) IMAGE FORMING APPARATUS

(75) Inventor: Jun Miyajima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 214 days.

(21) Appl. No.: 12/626,972

(22) Filed: Nov. 30, 2009

(65) Prior Publication Data
US 2010/0161837 A1 Jun. 24, 2010

(30) Foreign Application Priority Data

Dec. 18, 2008 (JP) ................... 2008-322957

(51) Int. Cl.
*G06F 3/00* (2006.01)
(52) U.S. Cl. ............... 710/8; 710/6; 710/55; 358/1.18
(58) Field of Classification Search ........... 358/1.15, 358/1.18; 710/6, 8, 25, 55
See application file for complete search history.

(56) References Cited

U.S. PATENT DOCUMENTS

| | | | |
|---|---|---|---|
| 7,136,941 B2 * | 11/2006 | Nguyen et al. ............ 710/15 |
| 8,233,176 B2 * | 7/2012 | Sasaki ..................... 358/1.15 |
| 2002/0140972 A1 * | 10/2002 | Onishi .................... 358/1.15 |
| 2003/0076532 A1 * | 4/2003 | Seto ....................... 358/1.15 |
| 2008/0062460 A1 * | 3/2008 | Yamada ................... 358/1.15 |
| 2008/0239368 A1 * | 10/2008 | Ota ........................ 358/1.15 |
| 2010/0195133 A1 * | 8/2010 | Adkins et al. ........... 358/1.14 |

FOREIGN PATENT DOCUMENTS

| JP | 2006-107468 | 4/2006 |
|---|---|---|
| WO | WO 2006-028279 | 3/2006 |

OTHER PUBLICATIONS

Cucu, Feasibility Intervals for Multiprocessor Fixed-Periority Scheduling of Arbitrary deadline, 2007, ieee, pp. 1-6.*

* cited by examiner

*Primary Examiner* — Ernest Unelus
(74) *Attorney, Agent, or Firm* — Fitzpatrick, Cella, Harper & Scinto

(57) ABSTRACT

A license issue system includes a user terminal and a license information issue server that are connected to a network. In the case in which there is a transfer source device in which license information issued by the license information issue server has been installed, and there is a transfer destination device that is to take over the license information installed in the transfer source device, the license issue system has the feature that the user terminal transmits, to the license information issue server, information regarding the transfer source device and the transfer destination device, and a license period during which the license can be used simultaneously in the transfer source device and the transfer destination device, and the license information issue server issues time-restricted license information to the transfer source device.

4 Claims, 17 Drawing Sheets

FIG. 10

ISSUE OF LICENSE

PLEASE INPUT DEVICE SERIAL NUMBER OF TRANSFER DESTINATION.

| 1010 | ~10001

FIG. 11

ISSUE OF LICENSE

PLEASE SELECT FUNCTION TO BE MOVED FROM TRANSFER SOURCE TO TRANSFER DESTINATION.

| FUNCTION B | ~11001

| FUNCTION C | ~11002

FIG. 12

ISSUE OF LICENSE

PLEASE INPUT EXPIRATION DATE OF
FUNCTION C IN TRANSFER SOURCE.

ISSUE OF LICENSE

FUNCTION C IS ACTIVATED IN
DEVICE SERIAL NUMBER 1000 UNTIL 2008/12/31.

PLEASE INPUT THE FOLLOWING LICENSE KEY
WITH RESPECT TO DEVICE SERIAL NUMBER 1000.

XXXX – XXXX – XXXX – XXXX  13001

FIG. 14

ACTIVATION / INVALIDATION OF FUNCTION

PLEASE INPUT LICENSE KEY ISSUED
BY LICENSE INFORMATION ISSUE SERVER.

XXXX — XXXX — XXXX — XXXX  — 14001

FIG. 15

ACTIVATION / INVALIDATION OF FUNCTION

FUNCTION C IS ACTIVATED UNTIL 2008/12/31.

PLEASE INPUT THE FOLLOWING LICENSE KEY
WITH RESPECT TO DEVICE SERIAL NUMBER 1010.

YYYY — YYYY — YYYY — YYYY  — 15001

FIG. 16

ACTIVATION / INVALIDATION OF FUNCTION

PLEASE INPUT LICENSE KEY ISSUED
BY LICENSE INFORMATION ISSUE SERVER.

YYYY – YYYY – YYYY – YYYY  — 16001

FIG. 17

ACTIVATION / INVALIDATION OF FUNCTION

FUNCTION C IS ACTIVATED.

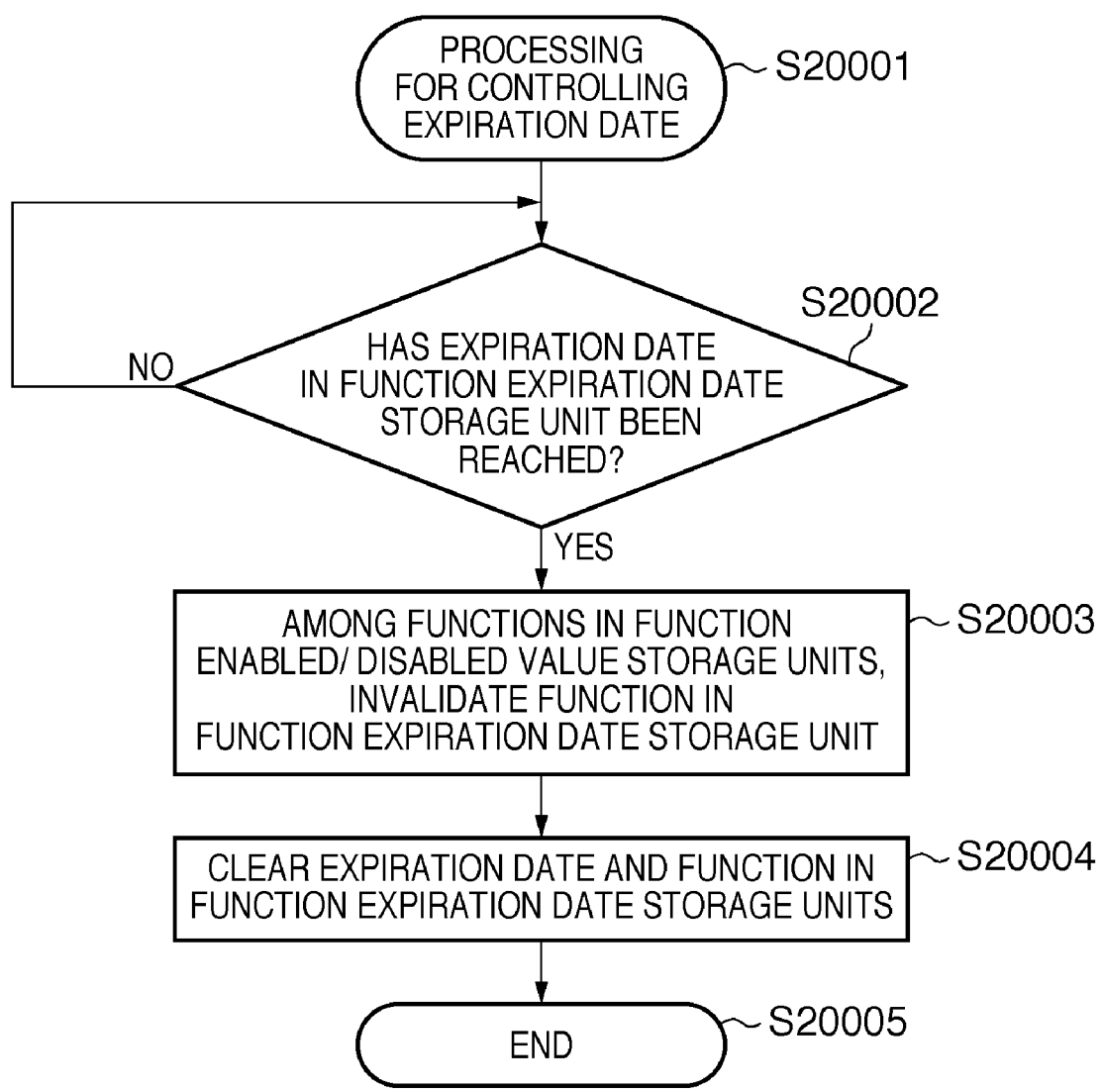

IMAGE FORMING APPARATUS

BACKGROUND OF THE INVENTION

1. Field of the Invention

The present invention relates to an image forming apparatus that has an image formation function, and a system that includes the apparatus. In particular, the present invention relates to technology for controlling license information in the image forming apparatus.

2. Description of the Related Art

Conventionally, there are license control systems that control a software license installed in a device. In such a system, a license is issued after submission of information unique to a device (such as a serial number) to which software is to be installed, which prevents the software from being used in devices other than the device to which the software is to be installed, that is to say, outside of the scope of the license.

However, when an enduser buys a new device, or the like, there is a need for the software used in the old device to continue to be usable in the new device as well. In order to realize this, it is necessary to transfer software license information to the new device from the old device. However, the functionality and structure of conventional license control systems are insufficient for realizing transfer of license information between devices while preventing software from being used outside the scope of its license.

Japanese Patent Laid-Open No. 2006-107468 has been proposed in order to cope with such a problem. In Japanese Patent Laid-Open No. 2006-107468, a license in a transfer source device can be reliably invalidated, and also license information can be transferred to the new device from the old device, and furthermore, it is possible for a server apparatus to collectively control exchange of the license between devices.

SUMMARY OF THE INVENTION

Japanese Patent Laid-Open No. 2006-107468 has enabled a license to be moved to a new device from an old device. However, since the license in the new device is activated only after the license has been reliably invalidated in the old device, a period when the license is invalidated in both the old and new devices occurs.

Meanwhile, there is the need for a license to be activated and for an application to be usable in both the old and new devices during the transitional period. For example, assume that an application for operating as a file server (hereinafter, a file server AP) exists in both the old and new devices, and that application is activated using a license. At this time, in a case in which there is only one license, and the license can be activated only in one of the two devices, the file server AP in either the old or new device cannot be operated, and a file in the old device cannot be moved to the new device.

According to an aspect of the present invention, provided is an image forming apparatus that is connected to an information processing apparatus, and that has a function that is activated and invalidated based on given license information, the image forming apparatus comprising: an accept unit that accepts transfer license information for moving a license of a designated function to a transfer destination device; a license information generation unit that generates activation license information for activating a function in the transfer destination device based on the transfer license information accepted by the accept unit; a provision unit that provides the information processing apparatus with the activation license information generated by the license information generation unit; and a deadline management unit that invalidates a function corresponding to the transfer license information when an expiration date of the transfer license information has passed.

With the above configuration, it is possible to satisfy the need for a license to be activated and for a necessary application to be usable in both old and new devices during the transitional period. Further, there is no impairment to the advantage of the conventional technology in that a server apparatus has been able to collectively control exchange of a license between devices.

Further features of the present invention will become apparent from the following description of exemplary embodiments with reference to the attached drawings.

BRIEF DESCRIPTION OF THE DRAWINGS

FIG. 10 is an example of a transfer destination device input screen generated in the license information issue server.

FIG. 11 is an example of a transfer function selection screen generated in the license information issue server.

FIG. 12 is an example of a screen for inputting a function enabled period in the transfer source device generated in the license information issue server.

FIG. 13 is an example of a transfer license key display screen generated in the license information issue server.

FIG. 14 is an example of a license key input screen generated in a device.

FIG. 15 is an example of a function expiration date screen generated in the device.

FIG. 16 is an example of a license key input screen generated in the device.

FIG. 17 is an example of a function activation screen generated in the device.

FIG. 20 is a flowchart of processing for controlling the expiration date in a device.

DESCRIPTION OF THE EMBODIMENTS

Embodiment

Figure 1:
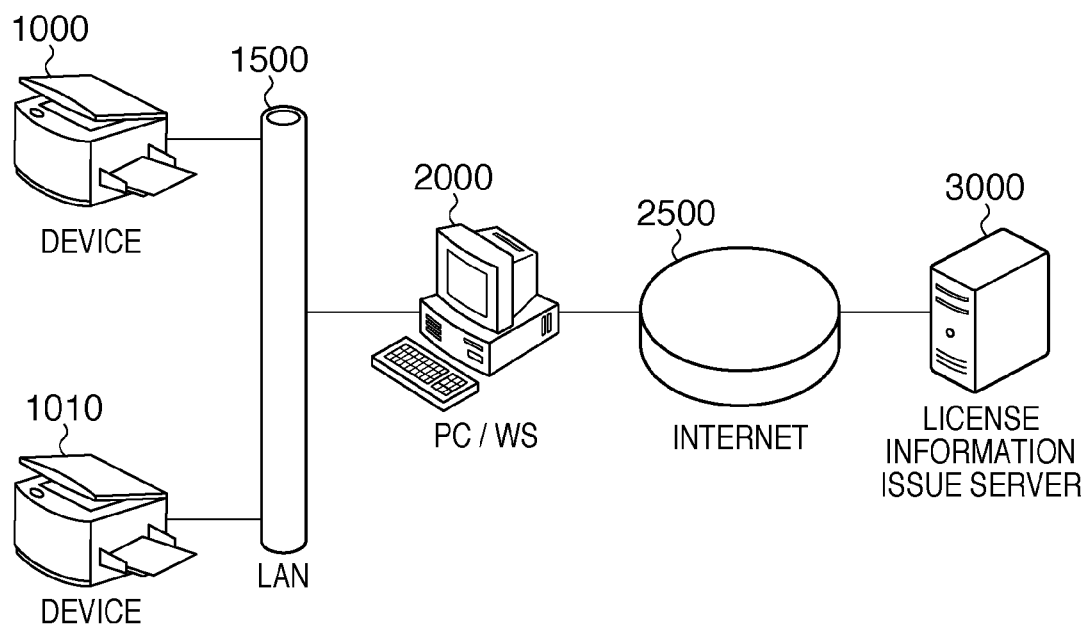
FIG. 1 is an example of an overall configuration diagram of a system to which an embodiment can be applied.

Hereinafter, an embodiment of the present invention is described with reference to the drawings. FIG. 1 is a diagram showing the overall system configuration of a license issue system to which the present invention can be applied. An old device 1000 in which a license is currently enabled, and a new device 1010 in which the license will be activated hereafter are connected via a LAN (local area network) 1500. Furthermore, the devices 1000 and 1010 are connected to a PC/WS 2000 via the LAN 1500. The PC/WS 2000 is connected to a license information issue server 3000 via Internet 2500.

In such a configuration, the PC/WS 2000 receives license information from the license information issue server 3000, and installs the license information in the devices 1000 and 1010. Although the devices 1000 and 1010 may directly exchange license information with the license information issue server 3000 based on instructions from a user, in this configuration, the PC/WS 2000 serving as an information processing apparatus is placed between the devices and the license information issue server. Thereby, using a web browser that operates on the PC/WS 2000, license information will be exchanged between the license information issue server 3000 and the devices 1000 and 1010. Here, the PC/WS is not limited to a PC (personal computer) or a WS (workstation), and can be anything as long as it can realize similar functions as an information processing apparatus.

Figure 2:
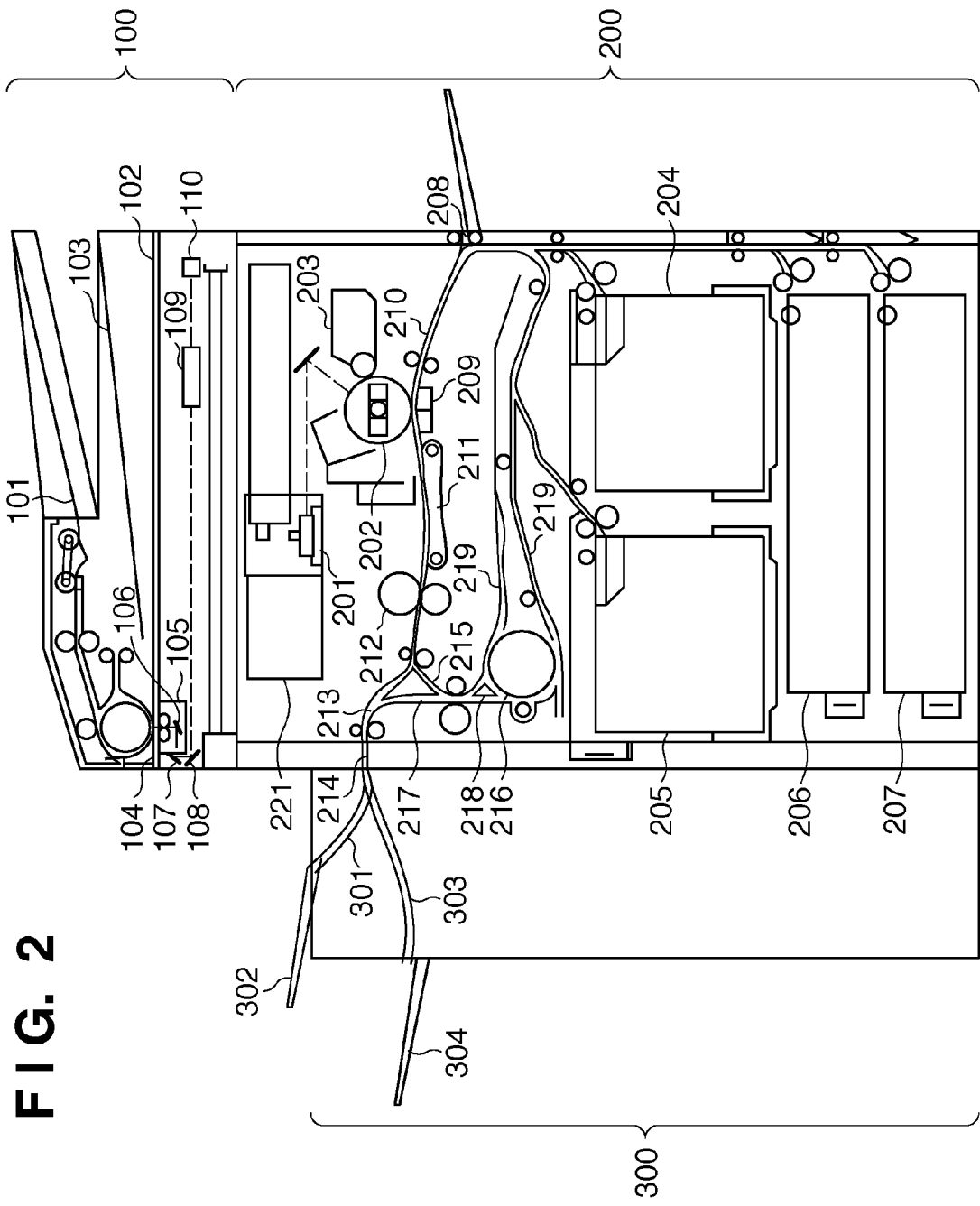
FIG. 2 is an example of a schematic cross-sectional diagram showing the internal configuration of a multifunction device serving as an image forming apparatus to which the embodiment can be applied.

FIG. 2 is a cross-sectional diagram showing the configuration of mechanism units, namely a scanner unit 100, a printer unit 200, and a post-processing apparatus 300 of a multifunction device that is an example of an image forming apparatus in the present embodiment. An original feeding unit 101 of the scanner unit 100 feeds, onto a platen glass 102, inserted originals one by one sequentially from the first original, and discharges the original on the platen glass 102 to a discharge tray 103 after the end of an original reading operation. When an original is fed onto the platen glass 102, a lamp 104 lights up, and an optical unit 105 is caused to start moving so as to expose and scan the original. The reflected light from the original at this time is guided to a CCD image sensor (hereinafter, referred to as a CCD) 110 by mirrors 106, 107, and 108 and a lens 109. In this way, an image on the scanned original is read by the CCD 110. Image data output from the CCD 110 is transferred to the printer unit 200 after a predetermined process has been performed thereon. Note that a multifunction device is an example of an image forming apparatus, and may be a printing apparatus with a single function, such as a printer, a scanner, or a facsimile, or an image input apparatus.

Next, the configuration of each unit of the printer unit 200 is described in detail as well as operations thereof. A laser driver 221 of the printer unit 200 drives a laser beam emitting unit 201, and causes the laser beam emitting unit 201 to emit laser beam according to image data output from the main body of the multifunction device. A photoconductive drum 202 is irradiated with the laser beam, and a latent image according to the laser beam is formed on the photoconductive drum 202. A developing device 203 causes developer to adhere to the portion where the latent image has been formed on the photoconductive drum 202.

As sheet storage portions, the printer unit 200 is provided with a cassette 204, a cassette 205, a cassette 206, and a cassette 207, each of which has a drawer-like shape, and a manual sheet feeding stage 208 that has a tray-like shape exposed outside the device. Conventionally, except the manual sheet feeding stage 208, sheets are supplied by pulling out a cassette, supplying sheets to that cassette, and closing the cassette. At a timing synchronized with the start of irradiation with the laser beam, a recording sheet is fed either from the cassette 204, the cassette 205, the cassette 206, the cassette 207, or the manual sheet feeding stage 208. The fed recording sheet is conveyed to a transfer unit 209 via a conveying path 210, and developer that has adhered to the photoconductive drum 202 is transferred to the recording sheet. The recording sheet with the developer thereon is conveyed to a fixing unit 212 by a conveying belt 211, and the developer is fixed on the recording sheet with the heat and pressure by the fixing unit 212. Subsequently, the recording sheet that has passed the fixing unit 212 passes along a conveying path 213 and a conveying path 214, and is discharged. Alternatively, in a case in which a printing face is reversed and discharged, the recording sheet is guided to a conveying path 215 and a conveying path 216, is conveyed in the opposite direction therefrom, and passes along a conveying path 217 and the conveying path 214.

Further, in a case in which double-sided recording is set, after passing the fixing unit 212, the recording sheet is guided to a conveying path 219 from the conveying path 215 by a flapper 218, is subsequently conveyed in the opposite direction, and is guided to the conveying path 216 and a sheet re-feeding conveying path 219 by the flapper 218. The recording sheet guided to the sheet re-feeding conveying path 219 passes along the conveying path 210 at the timing described above, and is fed to the transfer unit 209. Then, the recording sheet discharged from the conveying path 214 is conveyed to the post-processing apparatus 300. In the post-processing apparatus 300, a sheet discharged from the conveying path 214 of the printer unit 200 can be output to a discharge bin 302 called an escape tray via a conveying path 301, or to a discharge bin 304 called a main tray via a conveying path 303. Normally, a recording sheet is stacked in the discharge bin 304 serving as a main tray. However, a recording sheet that the user wishes to stack separated from the main tray is output to the discharge bin 302 called an escape tray. As one example of general usage, the output result of copying is output to the main tray, and the output result of faxing or the like is output to the escape tray. This post-processing apparatus 300 is controlled by a post-processing apparatus control unit 310, which is described later.

Figure 3:
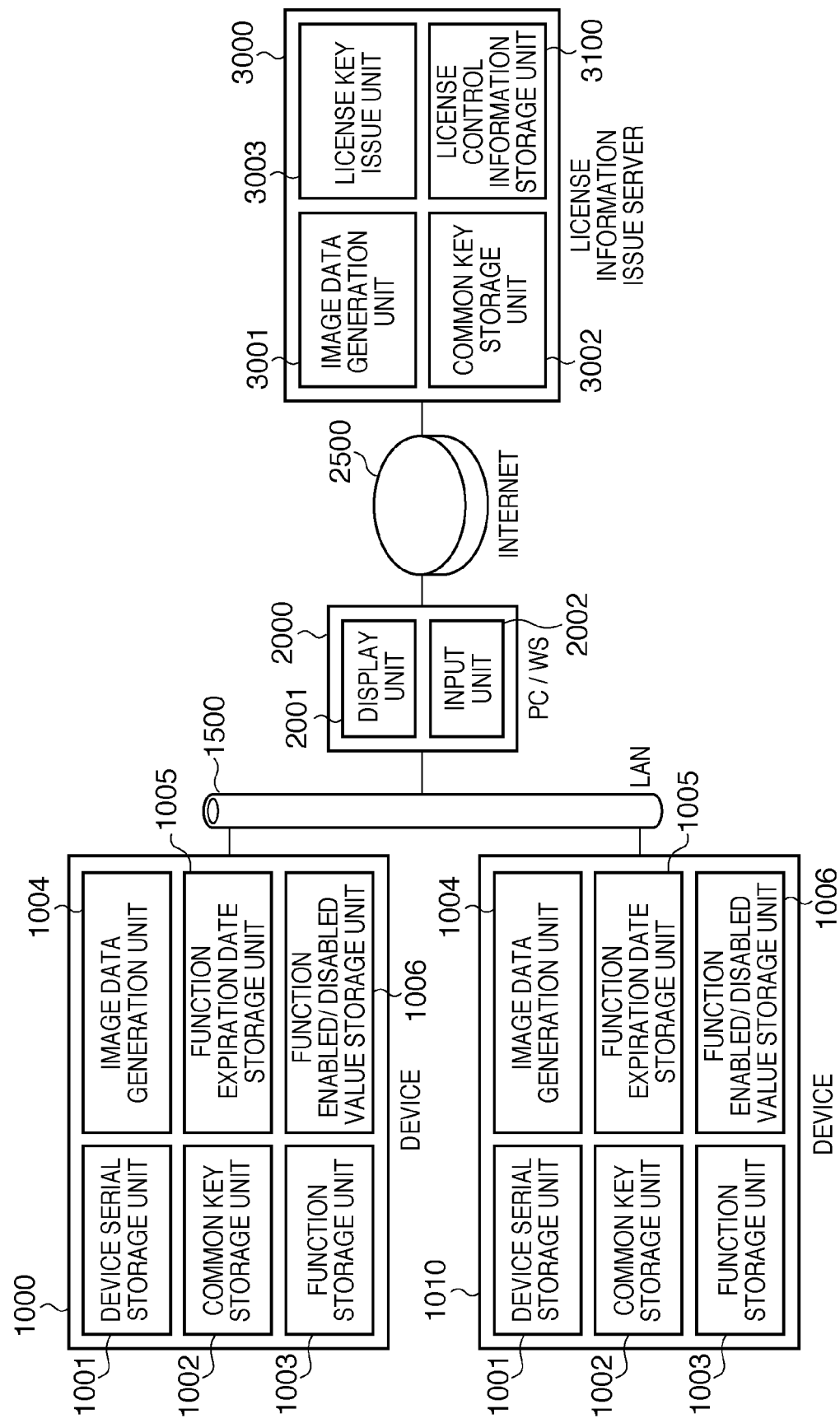
FIG. 3 is an example of a detailed view of the overall configuration of the system to which the embodiment can be applied.

Next, with reference to FIG. 3, the details of the internal configurations of the device 1000 and 1010, the PC/WS 2000, and the license information issue server 3000 in the present embodiment are described. The devices 1000 and 1010 are provided with a device serial storage unit (1001), a common key storage unit (1002), a function storage unit (1003), an image data generation unit (1004), a function expiration date storage unit (1005), and a function enabled/disabled value storage unit (1006).

In the device serial storage unit (1001), information unique to an apparatus, or in other words, a unique identifier assigned to each of the devices is stored. Here, the value "1000" is assumed to be stored in the device serial storage unit (1001) of the device 1000, and the value "1010" is assumed to be stored in the device serial storage unit (1001) of the device 1010. Thereby, the device serial storage units (1001) have a function as a unique information holding unit. Each common key storage unit (1002) stores a common key for encrypting license information exchanged between the license information issue server 3000 and the device 1000 or 1010 via the PC/WS 2000. In other words, the license information issue server 3000 and the devices 1000 and 1010 need key information for encrypting and decrypting information for information security, and the like, and a common key serving as that key information is stored and held in the common key storage units (1002). Thereby, the common key storage units (1002) have a function as a key holding unit. Each function storage unit (1003) is an area for storing a program that realizes a function that operates on the device 1000 or 1010. A program for realizing not only one function, but a plurality of functions is stored in the function storage units. Thereby, the function storage units (1003) have a function as a function holding unit. Each image data generation unit (1004) is a portion for generating image data to be displayed on the PC/WS 2000. Generally, an HTML file and the like are generated, the HTML file and the like are obtained via HTTP, and the HTML file is displayed via the web browser of the PC/WS 2000. Each function enabled/disabled value storage unit (1006) is an area for storing a setting value indicating which programs among the programs stored in the function storage unit (1003) have enabled or disabled functions. Functions are controlled so as to be enabled or disabled based on this information. Thereby, the function enabled/disabled value storage units (1006) realize an enabled/disabled control unit.

Each function expiration date storage unit (1005) is an area for storing the type of a function for which an expiration date has been set, and information on the enabled period thereof, based on the programs stored in the function storage unit (1003), and activation information stored in the function enabled/disabled value storage unit (1006). Based on this information, the function expiration date storage units (1005) control the expiration date of a function.

The PC/WS 2000 is comprised of a display unit (2001) and an input unit (2002). The display unit (2001) refers to a display that displays the web browser described above. The input unit (2002) refers to a keyboard or a mouse. The license information issue server 3000 is provided with an image data generation unit (3001), a common key storage unit (3002), a license key issue unit (3003), and a license control information storage unit (3100). The image data generation unit (3001) is a portion for generating image data to be displayed on the PC/WS 2000. Generally, an HTML file and the like are generated, the HTML file and the like are obtained via HTTP, and the HTML file is displayed via the web browser on the PC/WS 2000.

The common key storage unit (3002) stores a common key for encrypting license information exchanged between the license information issue server 3000 and the devices 1000 and 1010 via the PC/WS 2000. In other words, similar to the devices 1000 and 1010, the license information issue server 3000 also needs key information, and stores a common key serving as that key information in the common key storage unit (3002). Thereby, the common key storage unit (3002) has a function as a key holding unit. The license key issue unit (3003) is a portion for generating license information to be issued based on information input from the license control information storage unit (3100) and the PC/WS 2000, and performing issue processing. The license control information storage unit (3100) is a control area for controlling what kind of license information was issued in the past to which device. The internal configuration of this control area is described with reference to FIG. 4, FIG. 5, and FIG. 6. Hereinafter, license information is referred to as a license key.

Data Structure of License Information Control Server

Figure 4:
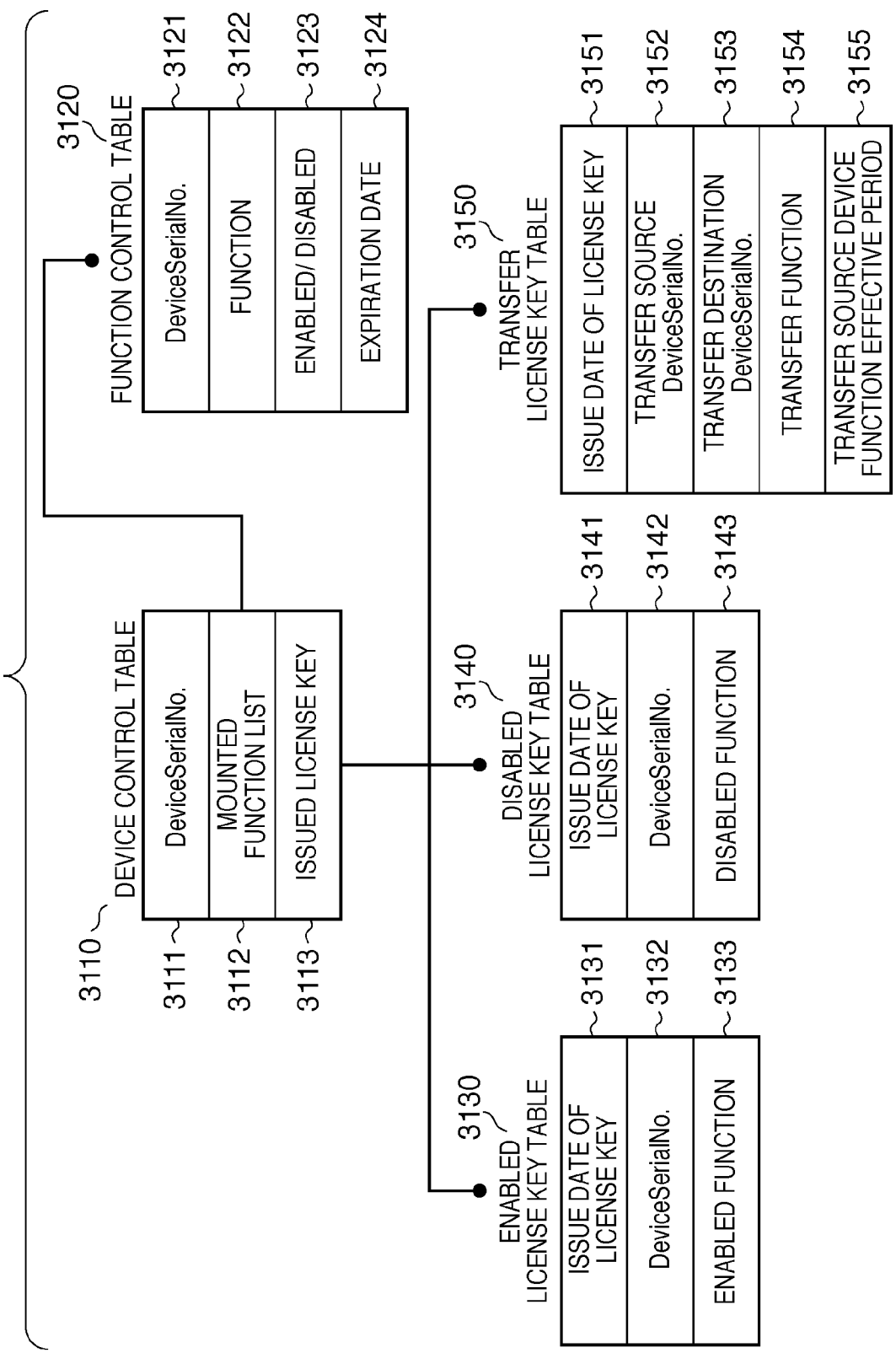
FIG. 4 is a configuration diagram of a license control information storage unit in a license information issue server in the embodiment.

Next, the data structure in the license control information storage unit (3100) is described with reference to FIG. 4.

The license control information storage unit (3100) comprises a device management table (3110), a function management table (3120), an enabled license key table (3130), an disabled license key table (3140), and a transfer license key table (3150). The device management table (3110) comprises a device serial number (3111) column, a mounted function list (3112) column, and an issued license key (3113) column.

In the device serial number (3111) column, information unique to an apparatus, or in other words, a unique identifier assigned to every device is stored. The mounted function list (3112) column is associated with the function management table (3120), and controls the list of mounted functions for every device. The issued license key (3113) column is associated with the enabled license key table (3130), the disabled license key table (3140), and the transfer license key table (3150). The issued license key (3113) column controls the list of the license keys issued to each device in the past.

The function management table (3120) is comprised of a device serial number (3121) column, a function (3122) column, an enabled/disabled (3123) column, and an expiration date (3124) column. The device serial number (3121) column is associated with the device serial number (3111) column of the device management table (3110). The function (3122) column shows information on a function mounted in this device. The enabled/disabled (3123) column shows whether the function mounted in this device is enabled or disabled. The expiration date (3124) column shows the expiration date of the function that is enabled in this device. The enabled license key table (3130) is comprised of an issue date of license key (3131) column, a device serial number (3132) column, and an enabled function (3133) column. The issue date of license key (3131) column shows the date when this license was issued.

The device serial number (3132) column is associated with the device serial number (3111) column of the device management table (3110). The enabled function (3133) column shows a function that has been activated using this enabled license key. The disabled license key table (3140) is comprised of an issue date of license key (3141) column, a device serial number (3142) column, and a disabled function (3143) column. The issue date of license key (3141) column shows the date when this license was issued. The device serial number (3142) column is associated with the device serial number (3111) column of the device management table (3110). The disabled function (3143) column shows a function that has been invalidated using this disabled license key. The transfer license key table (3150) is comprised of an issue date of license key (3151) column, a transfer source device serial number (3152) column, a transfer destination device serial number (3153) column, a transfer function (3154) column, and the transfer source device function enabled period (3155). The issue date of license key (3151) column shows the date when this license was issued.

The transfer source device serial number (3152) column is associated with the device serial number (3111) column of the device management table (3110). A device serial number of the device to which license information is transferred using this transfer license key is stored in the transfer destination device serial number (3153) column. The transfer function (3154) column shows a function transferred using this transfer license key. The transfer source device function enabled period (3155) column shows the enabled period of a function, which can be activated using this transfer license key, in the transfer source device.

Figure 5:
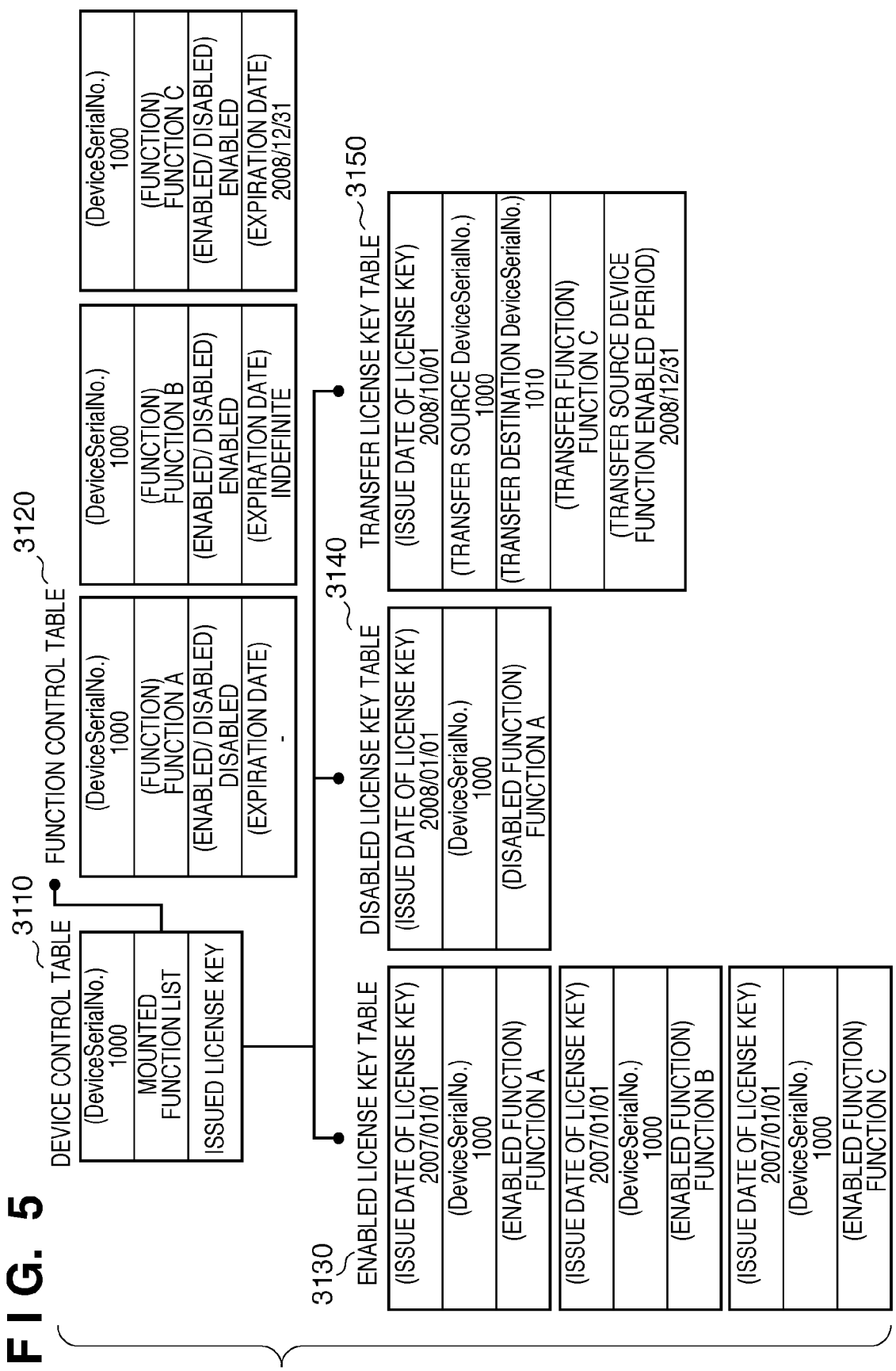
FIG. 5 is a diagram showing an example of the configuration of device data controlled by the license control information storage unit in the license information issue server in the present embodiment.
Figure 6:
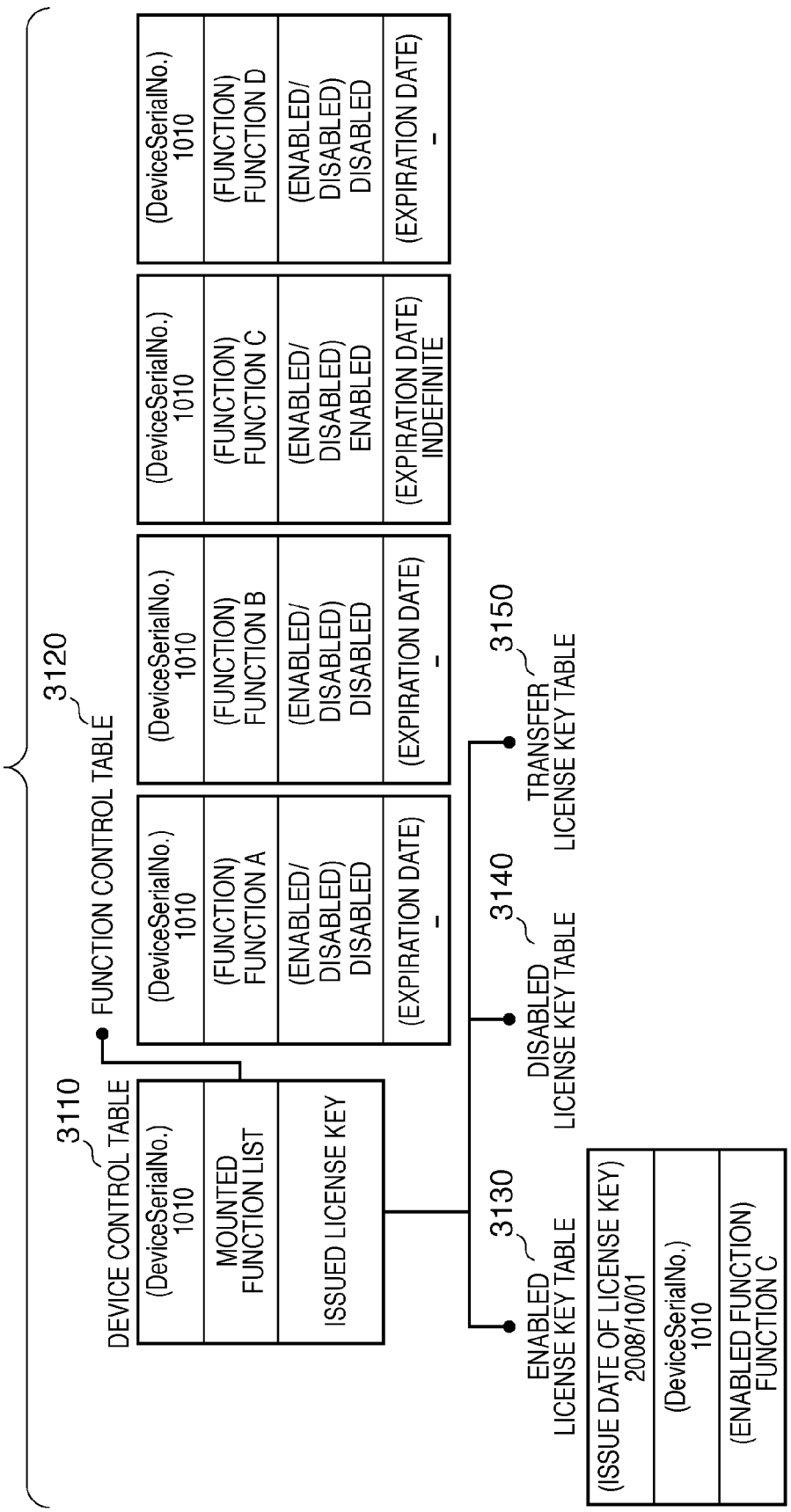
FIG. 6 is a diagram showing an example of the configuration of device data controlled by the license control information storage unit in the license information issue server in the present embodiment.

Next, with reference to FIGS. 5 and 6, a specific description is given regarding control information of the devices 1000 and 1010 in the license control information storage unit (3100). FIG. 5 shows data held by the license control information storage unit (3100) of the license information issue server 3000, in the case of controlling license control information of the device 1000. In the device management table (3110), a record of the value "1000" that is the device serial number indicating the device 1000 is registered.

In the function management table (3120), records indicating the following content are registered.
Function A: Disabled
Function B: Enabled; Expiration date: Indefinite
Function C: Enabled; Expiration date: 2008/12/31

In other words, the function management table (3120) shows that the functions A, B, and C are mounted in the device 1000, the functions currently activated are B and C, and the function C is enabled until 2008/12/31. Furthermore, in the enabled license key table (3130), records indicating the following content are registered:
Function A enabled on 2007/01/01
Function B enabled on 2007/01/01
Function C enabled on 2007/01/01

Moreover, in the disabled license key table (3140), a record indicating the following content is registered:
Function A disabled on 2008/01/01
Furthermore, in the transfer license key table (3150), records are registered indicating that the license key of the function C is transferred to the device 1010 from the device 1000 on 2008/10/01, and the expiration date of the function C in the device 1000 according to a transfer license key is 2008/12/31.

By using the enabled license key table (3130), the disabled license key table (3140), and the transfer license key table (3150) shown in FIG. 5 described above, the history of license keys issued to the device 1000 can be controlled. In other words, as the result of:
the functions A, B, and C being enabled on 2007/01/01, the function A being disabled on 2008/01/01, and the function C being transferred on 2008/10/01 (the function C of the device 1000 itself is enabled until 2008/12/31),
it can be determined from the records that the functions currently activated in the device 1000 are B and C, and the function C in the device 1000 is enabled until 2008/12/31. This result matches the values of the control table in the function management table (3120) shown in FIG. 5.

FIG. 6 shows data held in the license control information storage unit (3100) of the license information issue server 3000, in the case of controlling license control information of the device 1010.

In the device management table (3110), a record of the value "1010" that is the device serial number indicating the device 1010 is registered. In the function management table (3120), records indicating the following content are registered.
Function A: Disabled
Function B: Disabled
Function C: Enabled; Expiration date: Indefinite
Function D: Disabled In other words, the records indicate that the functions A, B, C, and D are mounted in the device 1010, the function currently activated is C, and the function C is indefinitely enabled. Furthermore, in the enabled license key table (3130), a record indicating the following content is registered.
Function C enabled on 2008/10/01 Furthermore, no record is registered in the disabled license key table (3140). Furthermore, no record is registered in the transfer license key table (3150).

By using the enabled license key table (3130), the disabled license key table (3140), and the transfer license key table (3150) shown in FIG. 6 described above, a history of license keys issued to the device 1010 can be controlled. In other words, as a result of the function C being enabled on 2008/10/01, the tables show that the function currently activated in the device 1010 is only C, and the function C is indefinitely enabled. This result matches the values of the control table in the function management table (3120) shown in FIG. 6.

Data Structure of License Key

Figure 7:
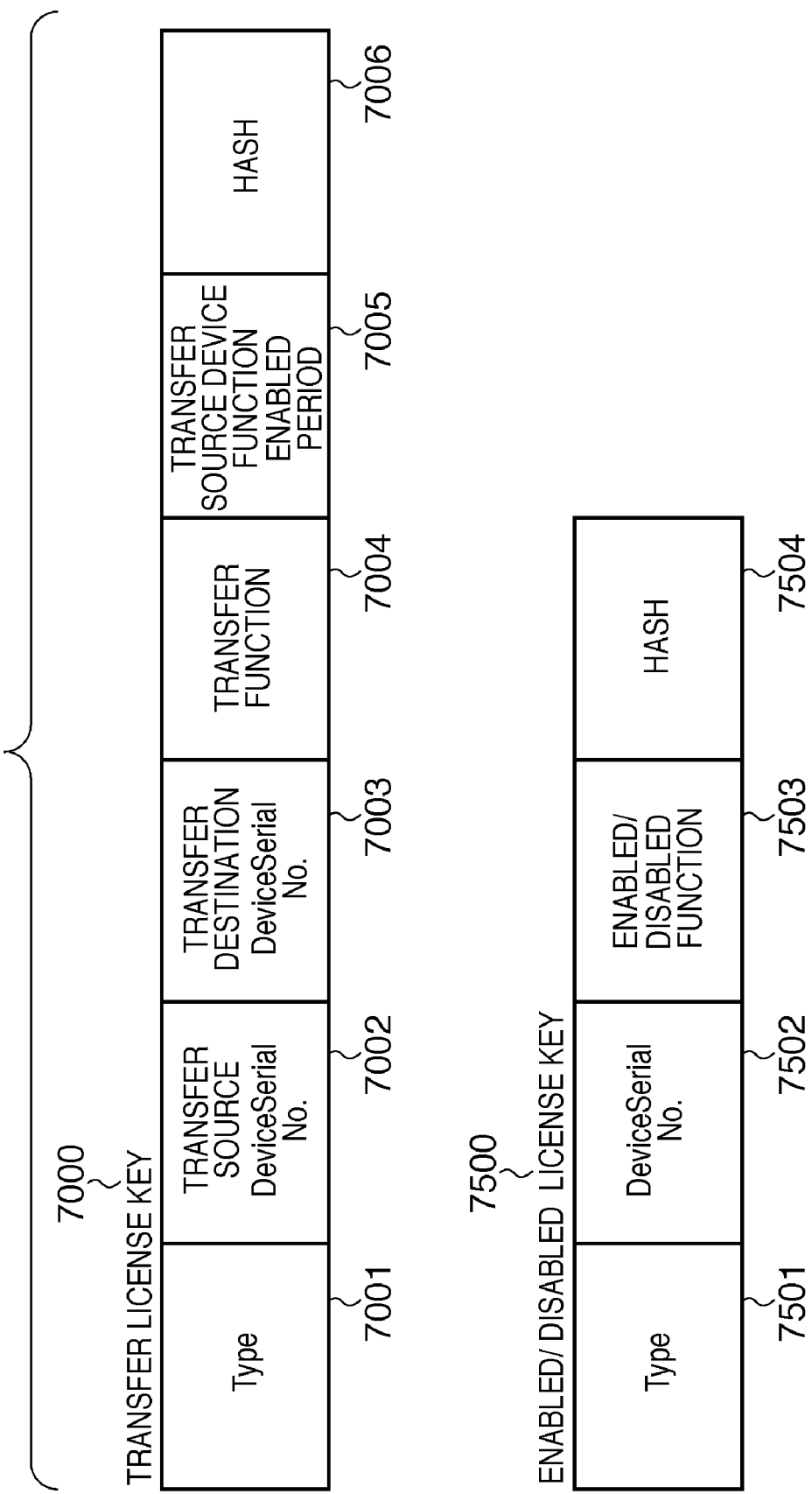
FIG. 7 is an example of the data structure of license keys to which the embodiment can be applied.

FIG. 7 shows the data structure of a license key generated by the license key issue unit (3003) of the license information issue server 3000, or the device 1000 or 1010. In the present embodiment, when a license key is transferred to a transfer destination device from a transfer source device, an example of transfer license information used in order to activate a function in both devices is a transfer license key 7000. A transfer license key is installed in a transfer source device with an expiration date of a certain period being provided, and is for enabling the function in both devices during that period. The transfer license key 7000 has items consisting of a Type (7001), a transfer source device serial number (7002), a transfer destination device serial number (7003), a transfer function (7004), a transfer source device function enabled period (7005), and a hash (7006).

Information indicating a type of this license key is stored in the Type (7001). Here, information indicating that the type is a "transfer license key" is stored. Incidentally, there are three types of keys, namely an "enabled license key", a "disabled license key", and a "transfer license key", and any one of these is stored in the Type. A device serial number of a transfer source device is stored in the transfer source device serial number (7002). A device serial number of a transfer destination device is stored in the transfer destination device serial number (7003). The type of a function to be transferred to a transfer destination device from a transfer source device is stored in the transfer function (7004). Information indicating the enabled period of a function in a transfer source device shown in the transfer function (7004) is stored in the transfer source device function enabled period (7005). The total hash value of the Type (7001), the transfer source device serial number (7002), the transfer destination device serial number (7003), the transfer function (7004), and the transfer source device function enabled period (7005) that have been previously described is stored in the hash (7006). Based on this hash value, a determination is made as to whether data of a license key is not corrupt.

An activation/invalidation license key 7500 has items consisting of a Type (7501), a device serial number (7502), an enabled/disabled function (7503), and a hash (7504). The Type (7501) shows that the type of this license key is either an "enabled license key" or a "disabled license key". A device serial number of the device to which this license key is to be applied is stored in the device serial number (7502).

The type of a function to be enabled or disabled in the device shown in the device serial number (7502) is stored in the enabled/disabled function (7503). If the Type (7501) is an "enabled license key", a function to be enabled is shown, and if the Type (7501) is a "disabled license key", a function to be disabled is shown. The total hash value of the Type (7501), the device serial number (7502), and the enabled/disabled function (7503) is stored in the hash (7504). Based on this hash value, a determination is made as to whether data of a license key is not corrupt. Using this activation/invalidation license key 7500, activation license information and invalidation license information can be transmitted and received.

Example User Interface for License Setting

Next, the flow of a transfer license key being issued is described with reference to FIGS. 8, 9, 10, 11, 12, and 13. The screens presented here are examples of screens in which image data generated by the image data generation unit (3001) of the license information issue server 3000 is displayed on the display unit (2001) of the PC/WS 2000. The user inputs necessary information and gives instructions using the screens described here. The license information control server and the devices provide these screens as an accept unit that accepts input information and instructions.

Figure 8:
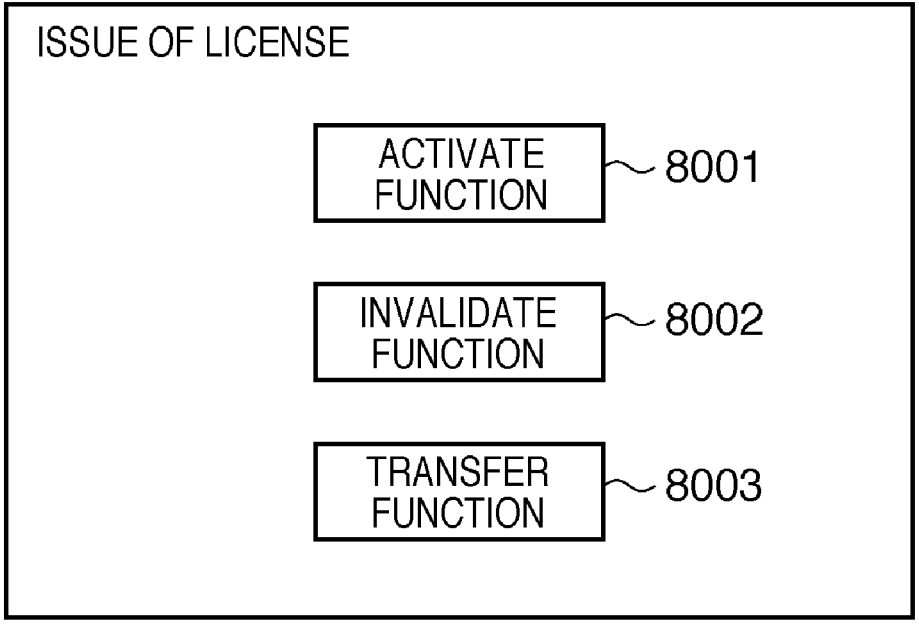
FIG. 8 is an example of a license issue processing function selection screen generated in the license information issue server.
Figure 9:
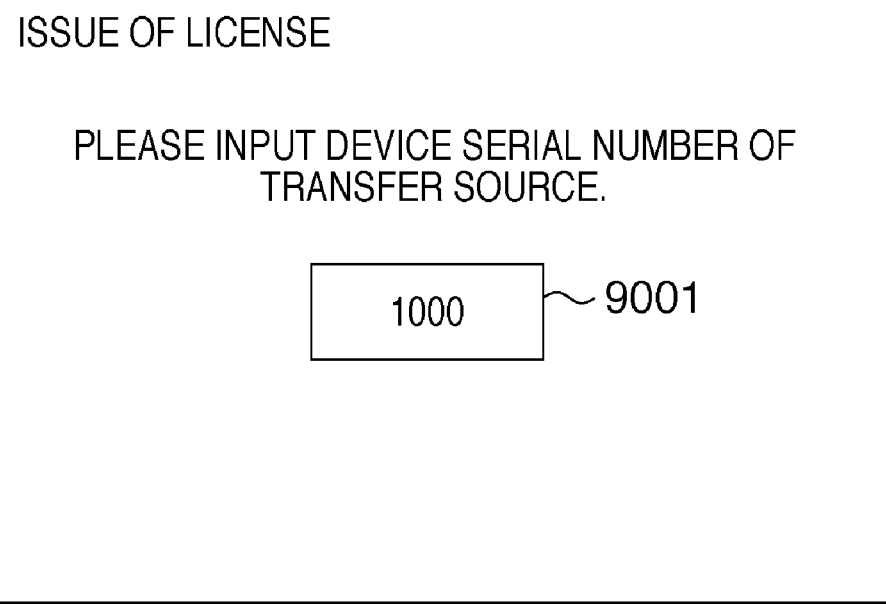
FIG. 9 is an example of a transfer source device input screen generated in the license information issue server.

First, the license information issue server 3000 is accessed from the PC/WS 2000. FIG. 8 shows an example of a screen displayed when the user accesses the license information issue server 3000 from the PC/WS 2000 using a web browser. The user selects a desired license from this screen, and requests the server to issue the license. The user selects the type of a desired license to be issued by pressing the button "activate function (8001)", "invalidate function (8002)", or "transfer function (8003)". FIG. 9 shows an example of image data generated by the image data generation unit (3001) of the license information issue server 3000 when the user presses the button "transfer function (8003)" on the screen shown in FIG. 8.

In FIG. 9, there is an item (9001) for inputting a device serial number of a transfer source device that has a function that the user desires to transfer, and here, the device serial number "1000" of the device 1000 is input.

FIG. 10 shows an example of a screen for designating a transfer destination device of a function that the user desires to transfer, and there is an item (10001) for inputting a device serial number of a transfer destination device. Here, the device serial number "1010" indicates that the device 1010 has been input.

FIG. 11 shows an example of a screen for selecting the type of a function that the user desires to transfer to a transfer destination device from a transfer source device. The type of a function that is enabled in the transfer source device, and furthermore is disabled in the transfer destination device is displayed. Here, a function B selection button (11001) and a function C selection button (11002) are displayed. Here, the function C selection button (11002) is pressed. FIG. 12 shows an example of a screen for inputting the expiration date until which the function C is enabled with a limit in a transfer source device using the transfer license. Here, 2008/12/31 is input.

FIG. 13 shows a screen for displaying an issued license key. The content obtained by encrypting the license key issued by the license key issue unit (3003) with the common key stored in the common key storage unit (3003) is displayed. Here, "XXXX-XXXX-XXXX-XXXX" is displayed as a transfer license key.

Next, the flow of registration of a transfer license key is described with reference to FIGS. 14 and 15. The screens presented in the diagrams are examples of image data generated by the image data generation unit (1004) of the device 1000, and are displayed on the display unit (2001) of the PC/WS 2000. First, the user accesses the device 1000 using the web browser of the PC/WS 2000.

FIG. 14 shows an example of a screen for inputting a transfer license key issued from the license information issue server 3000, with respect to the device 1000. Here, the transfer license key "XXXX-XXXX-XXXX-XXXX" displayed in FIG. 13 is input into a license key input item (14001).

FIG. 15 shows an example of a screen for displaying an activation license key to be input into the device 1010, as a result obtained by the device 1000 having processed the input transfer license key shown in FIG. 14. Here, "YYYY-YYYY-YYYY-YYYY" (15001) is displayed as an activation license key to be registered in a transfer destination device. Furthermore, the expiration date of the function C in the device 1000 defined in the transfer license key is also displayed.

Next, the flow of registration of an activation license key is described with reference to FIGS. 16 and 17. The screens presented in the diagrams are examples of image data generated by the image data generation unit (1004) of the device 1010, and are displayed on the display unit (2001) of the PC/WS 2000. First, the user accesses the device 1010 using the web browser of the PC/WS 2000.

FIG. 16 shows an example of a screen for inputting an activation license key issued from the device 1000, with respect to the device 1010. Here, the activation license key "YYYY-YYYY-YYYY-YYYY" displayed in FIG. 15 is input into a license key input item (16001).

FIG. 17 shows an example of a screen for displaying the result obtained by the device 1010 having processed the activation license key that was input as shown in FIG. 16. Here, the screen shows that the function activated in the device 1010 using the activation license key is the function C.

Processing for Issuing Transfer License Key

Figure 18A:
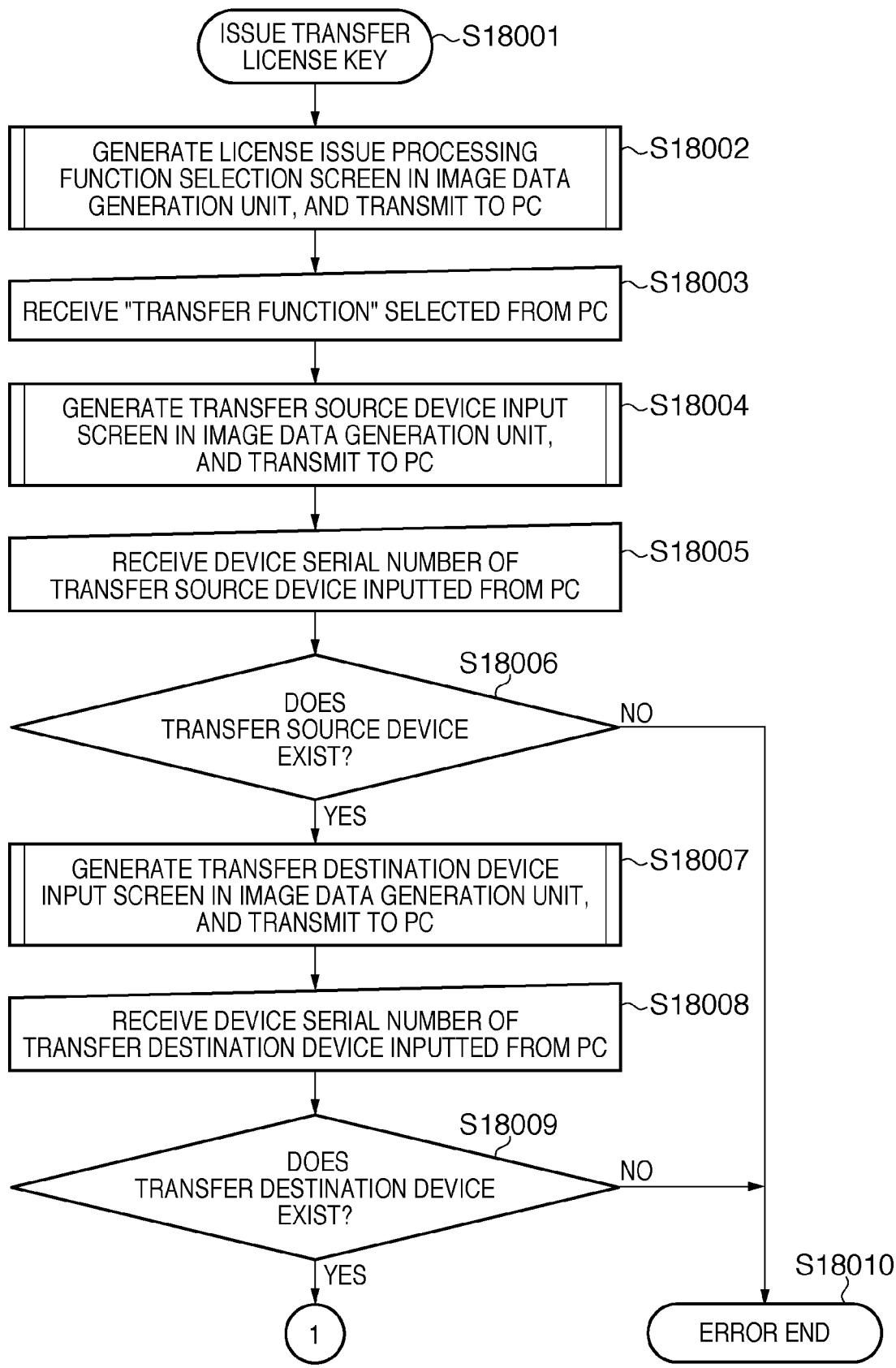
FIG. 18A is a flowchart of processing for issuing a transfer license key in the license information issue server.
Figure 18B:
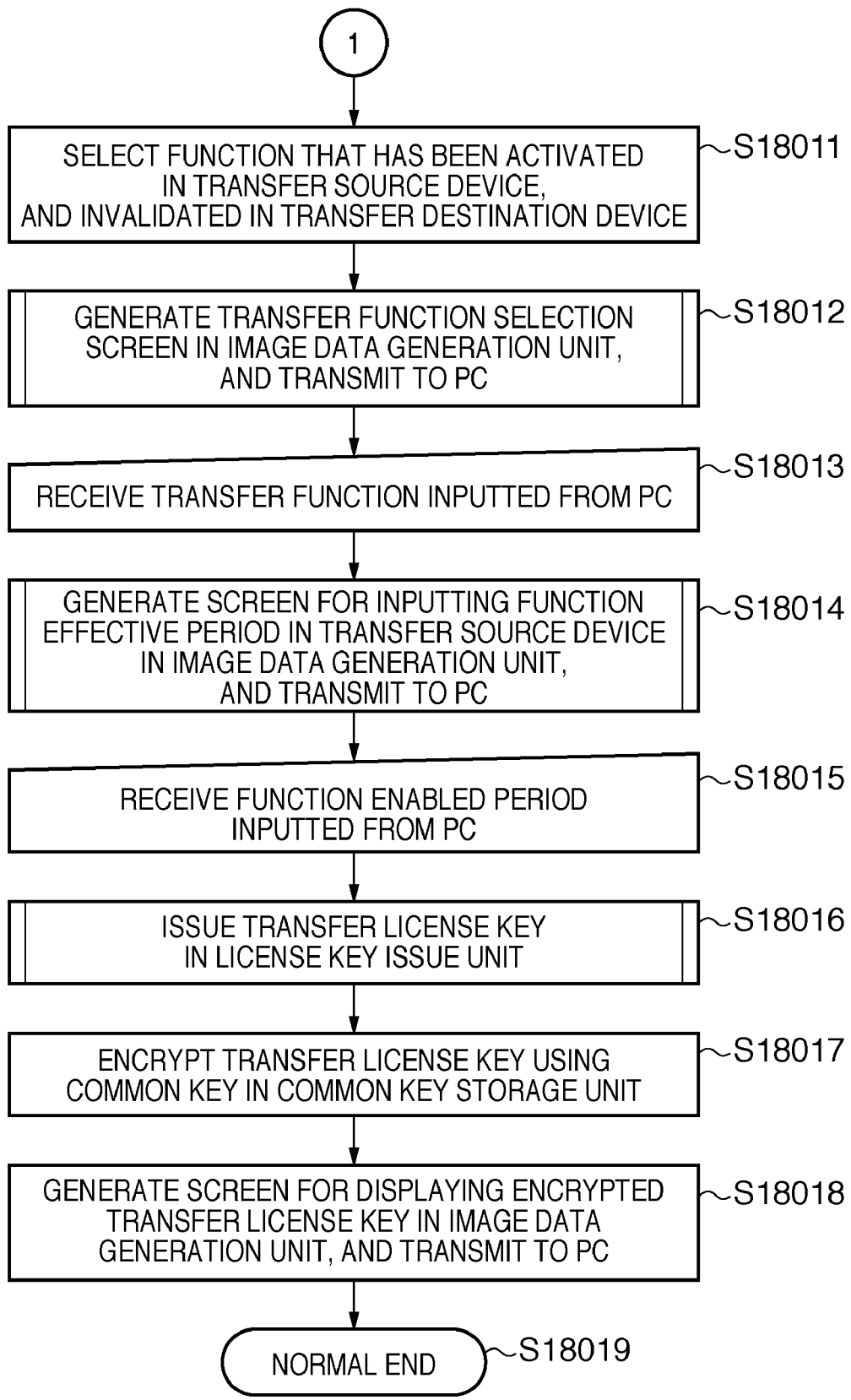
FIG. 18B is a flowchart of processing for issuing a transfer license key in the license information issue server.

Next, processing for issuing a transfer license key performed by the license information issue server 3000 is described with reference to FIGS. 18A and 18B.

In step S18001, the license information issue server 3000 starts processing for issuing a transfer license key. The start timing of processing here can be considered to be the time at which the user accesses the license information issue server 3000 via the web browser on the PC/WS 2000.

In step S18002, the license information issue server 3000 generates information for forming a license issue processing function selection screen in the image data generation unit (3001), and transmits the generated information to the PC/WS 2000. This screen corresponds to the screen shown in FIG. 8. In step S18003, the license information issue server receives the type of a function of license issue processing (transfer function) input by the user from the screen displayed on the PC/WS 2000 shown in FIG. 8. In step S18004, the license information issue server 3000 generates information for forming a transfer source device input screen in the image data generation unit (3001), and transmits the generated information to the PC/WS 2000. This screen corresponds to the screen shown in FIG. 9.

In step S18005, the device serial number of the transfer source device that the user input from the screen displayed on the PC/WS 2000 shown in FIG. 9 is received. In step S18006, it is determined whether the device corresponding to the device serial number of the transfer source device received in step S18005 exists in the record in the device management table 3110 of the license control information storage unit (3100) of the license information issue server 3000. If it is determined that such a device exists therein, the processing proceeds to step S18007, and if it is determined that such a device does not exist therein, the processing proceeds to step S18010. If the processing proceeds to step S18010, the processing ends as an error. In step S18007, the license information issue server 3000 generates information for forming a transfer destination device input screen in the image data generation unit (3001), and transmits the generated information to the PC/WS 2000. The information for forming this screen corresponds to the screen display shown in FIG. 10. In step S18008, the device serial number of the transfer destination device that the user input from the screen displayed on the PC/WS 2000 shown in FIG. 10 is received. In step S18009, it is determined whether the device corresponding to the device serial number of the transfer destination device received in step S18008 exists in the record in the device management table 3110 of the license control information storage unit (3100) of the license information issue server 3000. If it is determined that such a device exists therein, the processing proceeds to step S18011, and if it is determined that such a device does not exist therein, the processing proceeds to step S18010. If the processing proceeds to step 18010, the processing ends as an error.

In step S18011, the license information issue server 3000 selects the function that has been activated in the transfer source device, and furthermore invalidated in the transfer destination device from the information stored in the license control information storage unit (3100). In other words, in the example described in the present embodiment, it is assumed that the control information of a transfer source device indicates that the functions currently activated in the transfer source device are B and C, and the control information of a transfer destination device indicates that the functions currently invalidated in the transfer destination device are A, B, C and D. The functions B and C are examples of candidates of functions to be transferred. Incidentally, since the results obtained by processing the transfer license key are shown in FIGS. 5 and 6, the function C has already been activated with the expiration date in the transfer source device, and the function C has been activated in the transfer destination device. In step S18012, the license information issue server 3000 generates information for forming a transfer function selection screen in the image data generation unit (3001), and transmits the generated information to the PC/WS 2000. This screen corresponds to the screen shown in FIG. 11. In step S18013, the transfer function that the user selected from the screen displayed on the PC/WS 2000 shown in FIG. 11 is received and accepted. In step S18014, the license information issue server 3000 generates information for forming a function enabled period input screen in the image data generation unit (3001), and transmits the generated information to the PC/WS 2000. This screen corresponds to the screen shown in FIG. 12.

In step S18015, the function enabled period that the user input from the screen displayed on the PC/WS 2000 shown in FIG. 12 is received. In step S18016, the license information issue server 3000 issues the transfer license key (7000) shown in FIG. 7 in the license key issue unit (3003). Then, the information stored in the license control information storage unit (3100) is changed to the content shown in FIG. 5 and FIG. 6 when issuing the key. In step S18017, the license information issue server 3000 encrypts the transfer license key (7000) issued by the license key issue unit (3003) with the common key stored in the common key storage unit (3002).

In step S18018, based on the transfer license key encrypted in step S18017, the license information issue server 3000 generates information for forming a transfer license key display screen in the image data generation unit (3001), and transmits the generated information to the PC/WS 2000. This screen corresponds to the screen shown in FIG. 13. In step S18019, the license information issue server 3000 ends the processing for issuing a transfer license, normally.

Processing for Activating/Invalidating Function

Figure 19A:
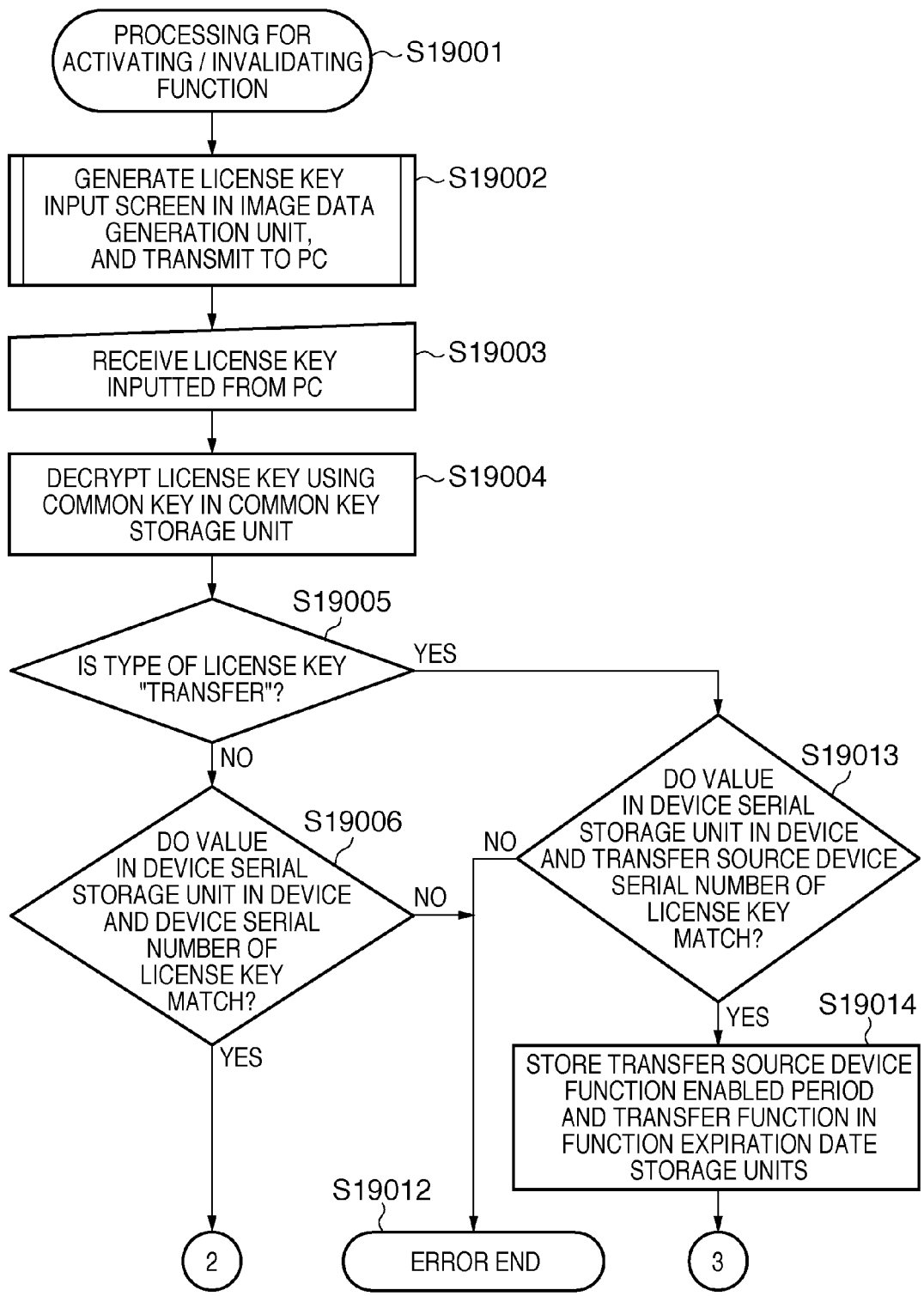
FIG. 19A is a flowchart of processing for activating/invalidating a function in the transfer source device or the transfer destination device.
Figure 19B:
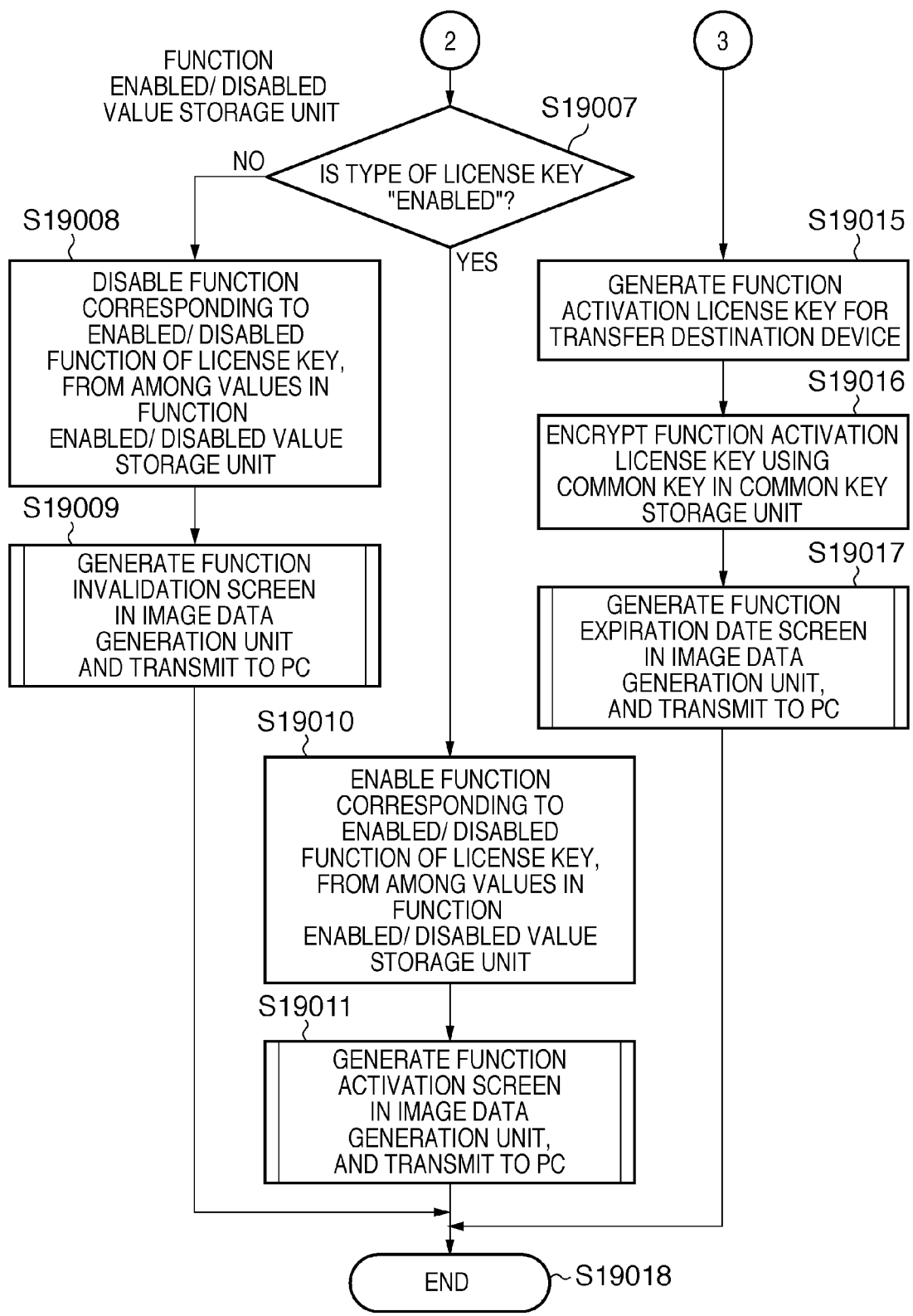
FIG. 19B is a flowchart of processing for activating/invalidating a function in the transfer source device or the transfer destination device.

Next, processing for activating/invalidating a function performed by the devices 1000 and 1010 is described with reference to FIGS. 19A and 19B. Here, for convenience, it is assumed that the device 1000 is the transfer source device, and the device 1010 is the transfer destination device. In step S19001, the transfer source device 1000 and the transfer destination device 1010 start processing for activating/invalidating a function. The start timing of processing here can be considered to be the time at which the user accesses the devices 1000 and 1010 via the web browser on the PC/WS 2000.

In step S19002, the image data generation unit (1004) of the transfer source device 1000 or the transfer destination device 1010 generates information for forming a license key input screen, and transmits the generated information to the PC/WS 2000. This screen corresponds to the screen shown in FIG. 14 or 16. In step S19003, the transfer source device 1000 or the transfer destination device 1010 receives the encrypted license key that the user input from the screen displayed on the PC/WS 2000 shown in FIG. 14 or 16. In step S19004, the encrypted license key received in step S19003 is decrypted using the common key stored in the common key storage unit (1002) of the transfer source device 1000 or the transfer destination device 1010. In step S19005, the Type (7001, 7501) of the license key is checked, and the type of the license key is determined. As described above, there are three types of license keys, namely an "activation license key", an "invalidation license key", and a "transfer license key". Here, if the type is determined as being an "activation license key" or an "invalidation license key", the processing proceeds to step S19006, and if determined as being a "transfer license key", the processing proceeds to step S19013.

In step S19006, it is determined whether the value stored in the device serial storage unit (1001) in the transfer source device 1000 or the transfer destination device 1010 and the device serial number (7502) of the license key match. If it is determined that the value and the number match, the processing proceeds to step S19007, and if it is determined that they do not match, the processing proceeds to step S19012. If the processing proceeds to step 51902, the processing ends as an error.

In step S19007, the type of the license key is determined again. In step S19005, the type is already narrowed down to two types, namely an "activation license key" and an "invalidation license key". If the type is determined as being an "activation license key", the processing proceeds to step S19010, and if determined as being an "invalidation license key", the processing proceeds to step S19008. In step S19008, among the values stored in the function enabled/disabled value storage unit (1006) in the transfer source device 1000 or the transfer destination device 1010, the value corresponding to the enabled/disabled function (7503) of the license key is disabled.

In step S19009, the image data generation unit (1004) in the transfer source device 1000 or the transfer destination device 1010 generates information for forming a function invalidation screen, and transmits the generated information to the PC/WS 2000. This screen corresponds to the screen shown in FIG. 15. In step S19010, among the values stored in the function enabled/disabled value storage unit (1006) in the transfer source device 1000 or the transfer destination device 1010, the value corresponding to the enabled/disabled function (7503) of the license key is enabled. In step S19011, the image data generation unit (1004) in the transfer source device 1000 or the transfer destination device 1010 generates information for forming a function activation screen, and transmits the generated information to the PC/WS 2000. This screen corresponds to the screen shown in FIG. 17.

In step S19013, it is determined whether the value stored in the device serial storage unit (1001) in the transfer source device 1000 and the transfer source device serial number (7002) of the transfer license key (7000) match. If it is determined that the value and the number match, the processing proceeds to step S19014, and if it is determined that they do not match, the processing proceeds to step S19012. If the processing proceeds to step S19013, the processing ends as an error. In step S19014, the transfer source device function enabled period (7005) and the transfer function (7004) that are included in the transfer license key (7000) are stored in the function expiration date storage units (1005) in the devices 1000 and 1010. In step S19015, the transfer source device 1000 generates an activation license key for the transfer destination device. In other words, the value of the transfer destination device serial number (7003) included in the transfer license key (7000) is copied to the value of the device serial number (7502) included in the activation license key (7500). Furthermore, the value of the transfer function (7004) included in the transfer license key is copied to the value of the enabled/disabled function (7503) included in the activation license key.

In step S19016, the transfer source device 1000 encrypts the activation license key for the transfer destination device generated in step S19015 using the common key stored in the common key storage unit (1002). In step S19017, the image data generation unit (1004) in the transfer source device 1000 generates information for forming a function expiration date screen, and transmits the generated information to the PC/WS 2000. This screen corresponds to the screen shown in FIG. 15. In step S19018, the transfer source device 1000 or the transfer destination device 1010 ends processing for activating/invalidating a function, normally.

Processing for Controlling Expiration Date

Next, processing for controlling the expiration date performed by the devices 1000 and 1010 is described with reference to FIG. 20. In this processing, when the expiration date of a license key has passed, processing for invalidating a function corresponding to that license key is implemented. In step S20001, the devices 1000 and 1010 start processing for controlling an expiration date. Periodical batch processing or the like can be considered as the start timing here.

In step S20002, the devices 1000 and 1010 compare the expiration date held in the function expiration date storage units (1005) in the devices 1000 and 1010 with the current date, and determine whether the expiration date has been reached. If the expiration date is determined as having been reached, the processing proceeds to step S20003, and if determined as not having been reached, the processing returns to step S20002 again. The process of step S20002 is periodically implemented.

In step S20003, among activated functions held in the function enabled/disabled value storage units (1006) in the device 1000 and 1010, the devices 1000 and 1010 invalidate the function that is held in the function expiration date storage unit (1005) and has been set so as to be enabled. In step S20004, the devices 1000 and 1010 clear the expiration date and the value of the function set in the function expiration date storage units (1005) in the device 1000 and 1010. In step S20005, the devices 1000 and 1010 end processing for controlling an expiration date, normally.

According to the present embodiment, it is possible to satisfy the need for a license to be activated in both the old and new devices and for an application to be usable in either device, during a license key transfer period. In other words, even in a case in which a file server AP exists in both old and new devices, and that application is to be activated using a license, it is possible to transfer a file in the old device to a new device during the transfer period. There is no impairment to the advantage of the conventional technology with which license information can be transferred to the new device from the old device, and furthermore a server apparatus can collectively control exchange of a license between devices.

The present embodiment is suitable, for example, for a multifunction device having various applications mounted therein as functions. For example, assume that the user has used a document control application and registered an electronic document in a multifunction device. Then, assume that the case occurs in which the user desires to move that document control application to another multifunction device and use the application. Then, the use of that document control application is enabled at both the transition source and the transition destination during a predetermined period, and the user needs to copy a document between the multifunction devices serving as the transition source and the transition destination during this period. In such a case, the present invention has an advantage that, with an expiration date, license restrictions are relaxed, and a plurality of multifunction devices can temporarily use the license. Further, another function to which the present invention can be applied is an optional function of a hardware expansion board in which a function for processing a language for variable printing and other printer languages has been implemented. Further, as an example of a function, there is a function for transmitting electronic data obtained by scanning paper and digitizing the result to other PCs via a network. A network function expansion board having various functions, such as the above function, can also be considered. The scope of the present embodiment includes these functions, as long as these functions are mounted in an image forming apparatus, and are invalidated and activated using license information.

Further, the devices controlled by the license information issue server 3000 are not limited to the devices described here, and the control periods thereof are not limited either.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-322957, filed Dec. 18, 2008, which is hereby incorporated by reference herein in its entirety.

What is claimed is:

1. A license issue system comprising:
a plurality of image forming apparatuses; and
a license issue device,
wherein the plurality of image forming apparatuses and the license issue device are connected via a network,
wherein each image forming apparatus includes:
an accept unit that accepts transfer license information for moving a license of a designated function to a transfer destination device, wherein the transfer license information is issued by the license issue device, and wherein the transfer destination device is an image forming apparatus that is different from a transfer source device and is one of the plurality of image forming apparatuses, a license information generation unit that generates activation license information for activating a function in the transfer destination device based on the transfer license information accepted by the accept unit, a provision unit that provides an information processing apparatus with the activation license information generated by the license information generation unit, and a deadline management unit that periodically compares a current date with a stored expiration date of the transfer license information and, when the stored expiration date has passed the current date, invalidates a function corresponding to the transfer license information, wherein the information processing apparatus, which is connected to the plurality of image forming apparatuses, provides the image forming apparatus, which is to function as the transfer destination device, with the activation license information.

2. The license issue system according to claim 1, wherein the license information generation unit generates the license information with which only a function of the image forming apparatus designated by a user as the transfer destination device can be activated.

3. A method for controlling an image forming apparatus that is connected to an information processing apparatus and that can activate and invalidate a function that the image forming apparatus has based on given license information, the method comprising, at the image forming apparatus, steps of:

accepting transfer license information for moving a license of a designated function to a transfer destination device, wherein the transfer license information is issued by the license issue device, and wherein the transfer destination device is an image forming apparatus that is different from a transfer source device and is one of a plurality of image forming apparatuses connected via a network;

generating activation license information for activating a function in the transfer destination device based on the transfer license information accepted in the accepting step;

providing an information processing apparatus with the activation license information generated in the generating step; and periodically comparing, using a processor, a current date with a stored expiration date of the transfer license information and, when the stored expiration date has passed the current date, invalidating a function corresponding to the transfer license information, wherein the image forming apparatus, which is to function as the transfer destination device, is provided with the activation license information by the information processing apparatus, which is connected to the plurality of image forming apparatuses.

4. A non-transitory computer-readable storage medium storing an application program for causing a computer to perform a method of controlling an image forming apparatus, the method comprising steps of:

accepting transfer license information for moving a license of a designated function to a transfer destination device, wherein the transfer license information is issued by a license issue device, and wherein the transfer destination device is an image forming apparatus that is different from a transfer source device and is one of a plurality of image forming apparatuses connected via a network;

generating activation license information for activating a function in the transfer destination device based on the transfer license information accepted in the accepting step;

providing an information processing apparatus with the activation license information generated in the generating step; and periodically comparing a current date with a stored expiration date of the transfer license information and, when the stored expiration date has passed the current date, invalidating a function corresponding to the transfer license information, wherein the image forming apparatus, which is to function as the transfer destination device, is provided with the activation license information by the information processing apparatus, which is connected to the plurality of image forming apparatuses.

* * * * *